US006704102B2

(12) United States Patent
Roelke

(10) Patent No.: US 6,704,102 B2
(45) Date of Patent: Mar. 9, 2004

(54) CALIBRATION ARTIFACT AND METHOD OF USING THE SAME

(75) Inventor: Richard Roelke, Bedford, NH (US)

(73) Assignee: Metronics, Inc., Bedford, NH (US)

( * ) Notice: Subject to any disclaimer, the term of this patent is extended or adjusted under 35 U.S.C. 154(b) by 264 days.

(21) Appl. No.: 09/777,529

(22) Filed: Feb. 6, 2001

(65) Prior Publication Data

US 2002/0105639 A1 Aug. 8, 2002

(51) Int. Cl.[7] .............................................. G01N 21/00
(52) U.S. Cl. ................... 356/243.1; 356/243.4
(58) Field of Search ................. 356/243.1–243.8; 33/501–573; 250/252.1

(56) References Cited

U.S. PATENT DOCUMENTS

| | | | | | |
|---|---|---|---|---|---|
| 4,750,141 A | * | 6/1988 | Judell et al. | ............... | 33/550 |
| 5,327,907 A | * | 7/1994 | Fisher | .................... | 33/558.01 |
| 5,389,774 A | | 2/1995 | Gelman et al. | .......... | 250/201.1 |
| 5,507,740 A | * | 4/1996 | O'Donnell, Jr. | ............. | 606/44 |
| 6,459,481 B1 | * | 10/2002 | Schaack | ................. | 356/241.1 |

FOREIGN PATENT DOCUMENTS

| EP | 0 998 124 A2 | 5/2000 |
|---|---|---|
| WO | WO 98/54593 | 12/1998 |
| WO | WO 01/38823 A1 | 5/2001 |

\* cited by examiner

Primary Examiner—Georgia Epps
Assistant Examiner—M. Hasan
(74) Attorney, Agent, or Firm—Iandiorio & Teska

(57) ABSTRACT

A calibration artifact and a method of calibrating a machine vision measurement system. The calibration artifact includes a substrate and a number of concentric rings on one surface of the substrate. Each ring is of a different pre-defined size. The change in the size of any two adjacent rings is different than the change in size of any other two adjacent rings.

4 Claims, 4 Drawing Sheets

CALIBRATION ARTIFACT AND METHOD OF USING THE SAME

FIELD OF THE INVENTION

This invention relates to machine vision measurement systems and in particular to the calibration of such systems using a calibration artifact in conjunction with calibration software.

BACKGROUND OF THE INVENTION

Machine vision measurements systems are used to inspect parts and components after production to insure they and their associated features meet specified tolerances. For example, a stamped stock piece with one or more bores may be placed on a stage under a video camera and viewed on a monitor in real time. The monitor is connected to a computer with measurement software operating thereon and, by using a mouse and/or a keyboard, the diameter of each bore can be accurately measured to evaluate whether the stamped piece was correctly manufactured for quality assurance purposes.

Machine vision measurement systems are capable of different magnification levels to accommodate parts of different sizes and to more accurately measure and view features of different sizes on any one part.

The measurement systems themselves are typically calibrated before they are installed at a user's facility and then routinely during use to insure the measurements taken are accurate. Typically, a calibration artifact is used to calibrate machine vision measurement systems. The artifact includes a number of different size circles and squares etched on one surface of a glass substrate. Adjacent each circle and square is its size. For example, there may be nine circles ranging in diameter from 0.01 mm to 5.0 mm.

The artifact is placed on the measuring stage and the calibration routine of the measurement software initiated. The technician then chooses a magnification level, and positions the calibration artifact such that the largest circle which fits on the monitor screen is chosen for accuracy reasons. The technician then reads the diameter of that circle off the artifact and enters it as an input to the calibration routine. The calibration routine then automatically correlates the size of the pixels on the monitor screen to the size of the entered known diameter so that, for the magnification level chosen, the number of pixels which make up any given distance or area is known.

The primary problem with this prior art calibration method is that the above process must be repeated for each magnification level. That is, for each magnification level, the calibration artifact must be repositioned such that the largest circle now occupies the viewing screen, and the diameter of that circle entered.

In addition, when using video to measure objects, it is very important that the lighting be correct. It is possible to introduce distortion of the image by over saturating the image. When such over saturation occurs, the dark parts of the image appears to shrink and the light parts seem to grow. One term for this is blooming. Excess light from an edge in the image encroaches on dark pixels and they start to register as white. Extreme cases of overexposure are easily detected by an operator, but when subpixeling for accuracy, subtle effects of blooming can seriously effect measurements and lead to errors.

Moreover, when the smallest size circles are in use (at high magnification), the pixel resolution is small (a 10 micron spot may fill the frame). The effect of manufacturing the artifact off by a micron is much larger than measuring off by a pixel. On the other hand, if the pixels are large (low magnification) the effect of measuring off by a pixel is much more than manufacturing off by a micron. Thus, one problem associated with prior art artifacts is a problem called "over or under etching". The pattern is laid down quite repeatability, but then the chrome is etched away. If the artifact is left in the etch too long, the chrome circles will be smaller on the outer dimension, and larger on the inner dimension. This effect is very similar to blooming.

Accordingly, the calibration artifact and the calibration method associated with the prior art results in a tedious and time consuming calibration process subject to errors if the technician incorrectly enters data, if blooming occurs, or if the artifact is not manufactured to strict tolerance levels and under or over etching occurs.

SUMMARY OF THE INVENTION

It is therefore an object of this invention to provide a new, easier to use calibration artifact for calibrating a machine vision measurement system.

It is a further object of this invention to provide such an artifact which renders the calibration procedure less complicated, less time consuming, and less prone to errors.

It is a further object of this invention to provide such a calibration artifact which allows the implementation of a more automatic calibration process.

It is a further object of this invention to provide a method of calibrating a machine vision measurement system which overcomes the problems associated with prior art methods.

It is a further object of this invention to eliminate the requirement that the technician must reposition the calibration artifact each time a different magnification level is chosen when calibrating a machine vision measurement system.

It is a further object of this invention to eliminate the need for the technician to input the diameter of each circle on the artifact when the magnification level changes.

It is a further object of this invention to eliminate the effects of blooming and over or under etching.

This invention results from the realization that the problems of prior art machine vision measurement system calibration methods can be overcome by a unique calibration artifact with concentric rings of different sizes and which does not have to be repositioned when different magnification levels are chosen, which eliminates the need for the technician to input the diameter of each circle when the magnification level changes, and which eliminates the effect of blooming.

The size of each ring and the change in diameter between each adjacent pair of rings is stored in the calibration software. One aspect of the invention is that the change in the size between each adjacent pair of rings is different. In this way, when the calibration software measures how many pixels occupy the two largest rings on the monitor screen, the calibration software can calculate the ratio of pixels occupying the two rings, and from that ratio, automatically establish the actual (calibrated) size of either ring. Once this information is known, the effective size of the pixels at that magnification level is set for future measurements and, by repeating the above process at each magnification level, the machine vision measurement system is thus properly calibrated without the need to ever reposition the artifact, or enter size information.

This invention features a calibration artifact for calibrating a machine vision measurement system. The calibration artifact comprises a substrate and a plurality of concentric rings on one surface of the substrate, each ring of a different pre-defined size. In the preferred embodiment, the change in the size of any two adjacent rings is different than the change in size of any other two adjacent rings.

The method of calibrating a machine vision measurement system of this invention includes placing a calibration artifact including a series of concentric rings under a camera of the machine vision measurement system; choosing a magnification level; measuring the size of a first largest ring in pixels; measuring the size of a second largest ring in pixels; comparing the sizes; and determining, from the comparison, the actual diameter of one of the rings. Each ring is of a pre-determined different size and the change in the size of any two adjacent rings is different than the change in size between any other two adjacent rings. The method may further include determining a first average of the measured size of the first largest ring in pixels and the measured size of the second largest ring in pixels. The method may further include measuring the size of a third largest ring in pixels and determining a second average of the measured size of the third largest ring in pixels and the measured size of the second largest ring in pixels. Comparing may include using the first and second averages.

Typically, each ring is of a pre-determined different size and the change in the size of any two adjacent rings is different than the change in size between any other two adjacent rings.

The calibration artifact preferably includes a substrate and a plurality of concentric shapes (e.g., rings) on one surface of the substrate. Each shape has a different pre-defined size and the change between the size of any two adjacent shapes is different than the change in size between any other two adjacent shapes.

This invention also features a calibration system including a calibration artifact and a software algorithm. The artifact includes a substrate, and a plurality of concentric rings on one surface of the substrate. Each ring is of a different pre-defined size and the change between the size of any two adjacent rings is different than the change between the size of any other two adjacent rings. The software algorithm includes a database containing the size of each ring and data reflecting the change in size between each pair of adjacent rings.

The method of calibrating a machine vision measurement device comprises placing a calibration artifact including at least one ring with inner and outer edges under a camera of the machine measurement system; choosing a magnification level; measuring the size of the outer edge of the ring in pixels; measuring the size of the inner edge of the ring in pixels; and averaging the measured size of the outer edge of the ring and the inner edge of the ring.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
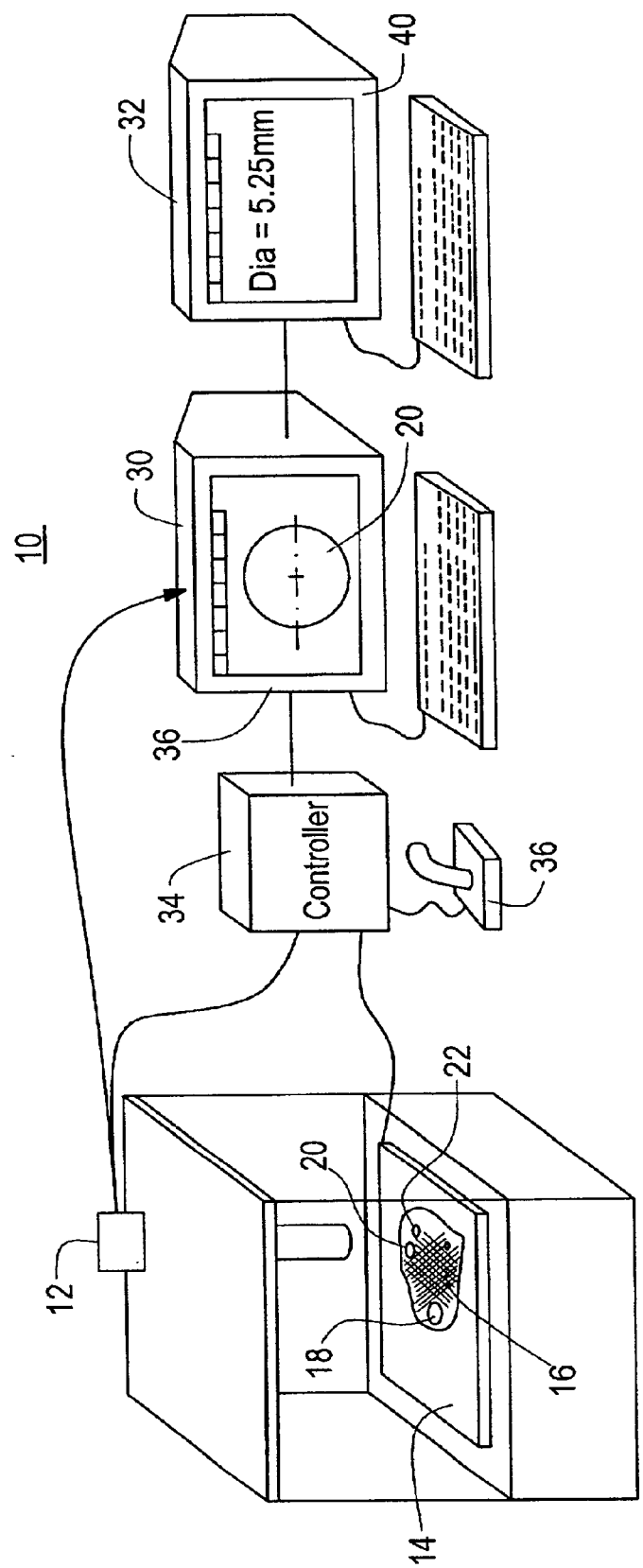
FIG. 1 is a schematic view showing the primary components associated with a typical machine vision measurement system.

Machine vision measurement system 10, FIG. 1 includes video camera 12 mounted over X-Y translation stage 14 on which flat part 16 is placed. In some embodiments, machine vision system do not use a translation stage. Part 16 includes bores 18, 20, and 22, for example, which must be measured prior to part 16 being shipped from the factory or machine shop. Computer 30 and optional computer 32 receive information from camera 12. Controller 34 may be used to control X-Y table 14 by use of joystick 36. In other embodiments, the part is not moved and no controller or translation stage is required. Monitor 36 of computer 30 displays bore 20 and measurement software residing on computer 30 automatically measures the diameter of bore 20 and, in some embodiments, displays the diameter on monitor 40.

By selecting a menu icon (not shown), the magnification level of camera 12 can be changed to view and measure both large and small features of part 16.

Figure 2:
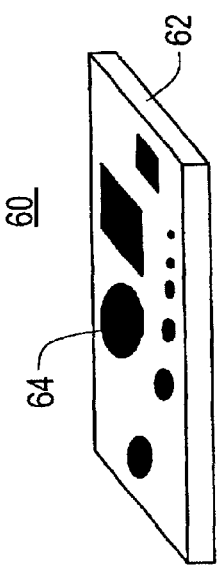
FIG. 2 is a schematic view of a typical prior art calibration artifact for calibrating the machine vision measurement system shown in FIG. 1.

As discussed in the Background of the Invention section above, calibration artifact 60, FIG. 2 is used in the prior art to calibrate system 10. Artifact 60 includes spaced metallic circles and squares of known sizes etched on the top surface of glass substrate 62. Artifact 60 is about the size of a typical microscope slide. Circle 64 may be 5 mm in diameter while the smallest circle (which is invisible to the naked eye) may be only 0.01 mm in diameter. Adjacent each circle is imprinted its diameter so that the calibration technician can enter the diameter of the circle as input into the calibration software.

In the prior art, calibration is accomplished as follows. First, the technician places artifact 60, FIG. 2 on table 14 under camera 12 and chooses one magnification level, step 80, FIG. 3. The user then positions artifact 60, FIG. 2 such that the largest circle on the artifact which can be imaged by camera 12, step 82, FIG. 3 is displayed on monitor 36, FIG. 1.

Figure 3:
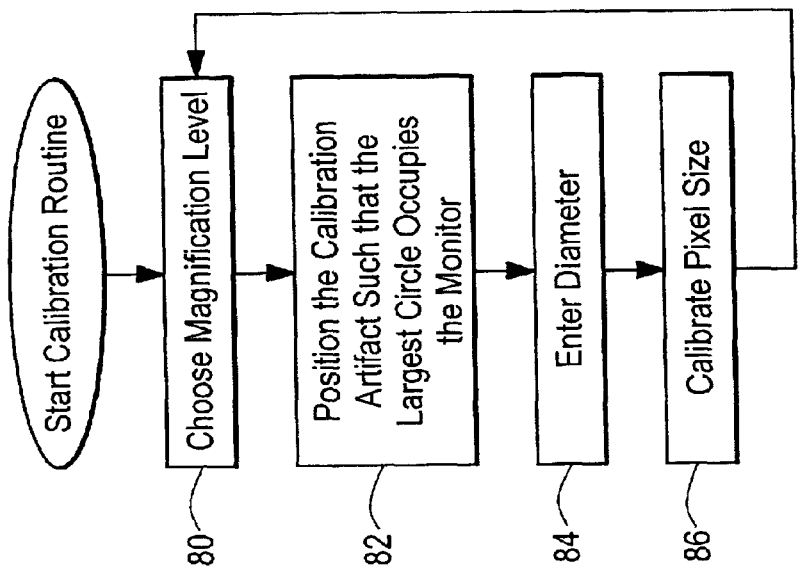
FIG. 3 is a flow chart depicting the primary steps associated with calibrating the machine vision measurement system shown in FIG. 1 using the calibration artifact shown in FIG. 2.

In step 84, FIG. 3 the technician reads the diameter of the circle off the artifact and enters that reading as input into the calibration routine operating on the computer 32, FIG. 1. In step 86, the calibration routine of the measurement software which resides on computer 32 (and/or computer 30) then automatically calibrates the pixel size for monitor 36 for the magnification level chosen at step 80.

Prior art machine vision measurements system 10, FIG. 1, the measurement software and its associated calibration routines, and artifact 60, FIG. 2 are available from a number of different companies including the assignee of the subject application.

As explained above, prior art artifact 60 and the calibration method associated with using it as shown in FIG. 3 suffers from a number of disadvantages. First, steps 82–86 of FIG. 3 must be repeated for each magnification level selected in step 80. Thus, the prior art method is a tedious and time consuming process and subject to errors if the technician inputs an incorrect dimension.

Figure 4:
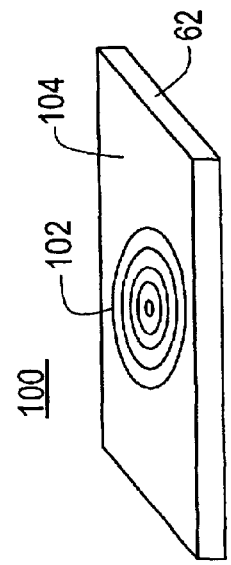
FIG. 4 is a schematic view of the calibration artifact of the subject invention.

In the subject invention these disadvantages associated with the prior art are overcome by employing new artifact 100, FIG. 4.

Artifact 100 (also about the size of a microscope slide) includes glass substrate 62. But, instead of a number of spaced different diameter circles, substrate 62 includes several (e.g., 8) concentric rings 10 deposited on or etched into surface 104 typically by forming a pattern of 17 circles that are alternatively filled resulting in one central inner circle and 8 concentric rings of increasing diameter.

Each ring has a different diameter. For example the largest ring may be 12.0154 mm in diameter and the smallest may be 0.01 mm in diameter.

In this invention, the change between the inner (or outer) diameter of any two adjacent rings is different than the change between the diameter of any two other adjacent rings. Thus, by way of illustrative example, the difference in the size between the two largest circles is 12.015:9.328 or 129% while the difference in size between the next two smallest circles is 9.328:7.140 or 131%. The difference in size between the two smallest circles is 0.025:0.010 or 250% and the difference in size between the next two largest rings is 0.0523:0.025 or 208%.

Since the ratio of change in size between any two adjacent rings is a dimensionless number and since the change in size is a priori always different as between any pair of adjacent rings, the change in size data can be used to more quickly and more automatically calibrate machine vision measurement system 10, FIG. 1.

Figure 5:
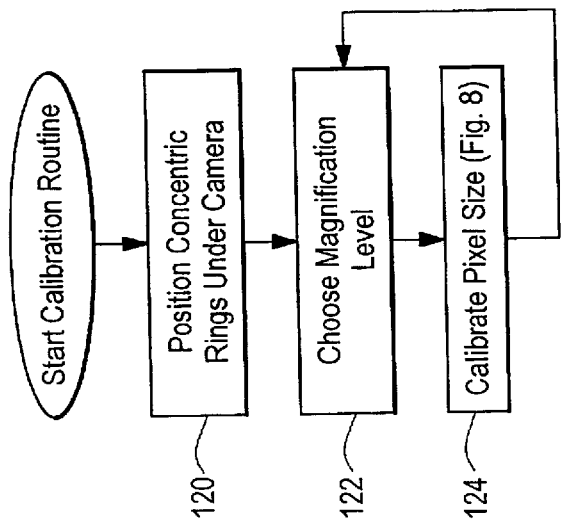
FIG. 5 is a flow chart depicting the primary steps associated with calibrating the machine vision measurement system of FIG. 1 using the calibration artifact of FIG. 4.

Specially designed artifact 100, FIG. 4 is used in accordance with the method of this invention and a novel calibration sub-routine as shown in the flow chart of FIG. 5.

In step 120, the concentric rings of artifact 100, FIG. 4 are positioned under camera 12, FIG. 1. The user next chooses the magnification level, step 122 and initiates the calibration routine to calculate the pixel size, step 124.

Figure 6:
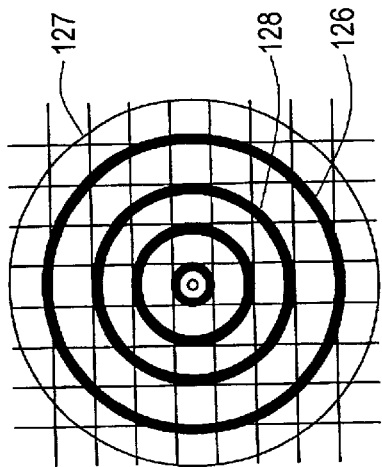
FIG. 6 is a view of a portion of the monitor of the machine vision measurement system shown in FIG. 1 when the artifact of FIG. 4 is used in accordance with the calibration routine depicted in FIG. 5.

As shown in FIG. 6, the magnification level chosen is fairly low such that the second and third largest rings appear on monitor 36, FIG. 1. The largest ring, ring 127, which is 12.010 mm in diameter, cannot be fully imaged by camera 12. Ring 126 (which can be fully imaged) is 9.328 mm in diameter and ring 128 is 7.140 mm in diameter, but this information need not be known by the technician and need not be entered as input into the calibration software.

Figure 8:
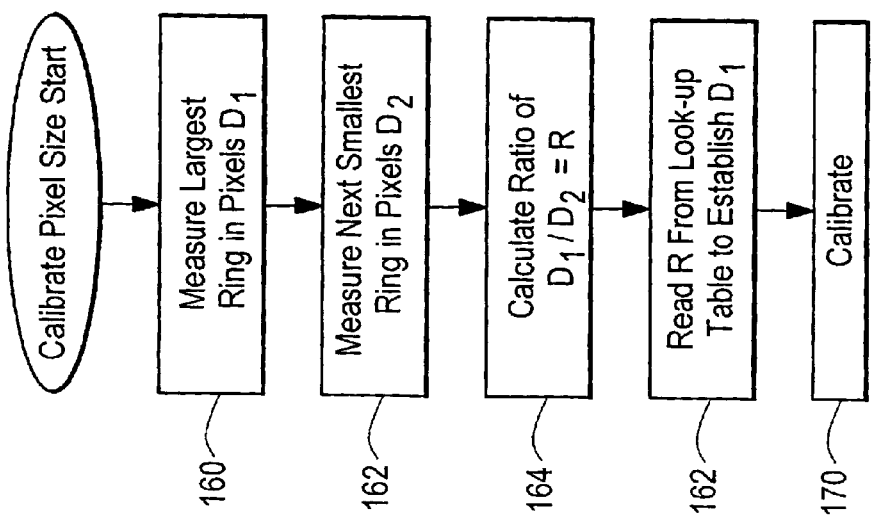
FIG. 8 is a flow chart depicting the primary steps associated with the pixel size calibration sub-routine of the subject invention.

Instead, the calibration software automatically measures the largest ring 126 (in pixels) step 160, FIG. 8 and automatically measures the next smallest adjacent ring 128, FIG. 6 (in pixels), step 162, FIG. 8. The largest rings which can be imaged by the camera at a given magnification level are chosen for measurement for accuracy reasons since, at the magnification level chosen, the largest rings which can be viewed will accommodate the most pixels as shown in FIG. 6.

Next, the ratio of the pixel sizes of rings 126 and 128, FIG. 6 is calculated, step 164, FIG. 8. In this case the ratio is 400:305.3 or 131%.

Since this ratio is a dimensionless number and reflects the change in size between two adjacent rings, the ratio can then be accurately used by the calibration software to determine the size of ring 126 since no two adjacent rings have the same change in size as delineated above. Thus, in step 166, FIG. 8, the ratio calculated is matched with the ratios stored in look-up table or database 200, FIG. 7 which is programmed as a part of the calibration software and which includes diameter information for each ring, in this example, the size of ring 126, FIG. 6.

The prior art calibration routine is then initiated, step 170, FIG. 8 and thereafter the technician then chooses the next magnification level, step 122, FIG. 5.

In this way, the technician never has to reposition the calibration artifact, and never has to enter the size of any ring thus eliminating steps 82–84, FIG. 3 of the prior art methodology using prior art artifact 60, FIG. 2. Instead, artifact 100, FIG. 4 is positioned once under the camera and the technician then simply chooses various magnification levels as shown at steps 122–124, FIG. 5.

Figure 7:
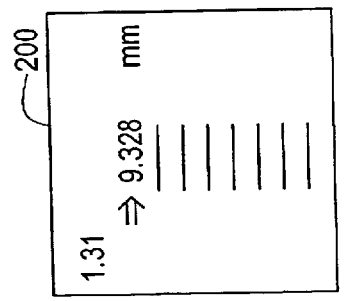
FIG. 7 is a view of a portion of the look-up table or database associated with the calibration software algorithm of the subject invention.

In the extremely simplified example shown in FIGS. 6 and 7, ring 126 occupies 400 pixels and ring 128 occupies 305.3 pixels. Thus, the ratio in step 164 is 1.31. However, this is also the ratio of the actual diameter of ring 128 compared to the actual diameter of ring 126 (9.328:7.140) and thus, so long as no two adjacent rings in the database of ring sizes and ratios have the same change in size as any other two adjacent rings, the calibration software will always be able to automatically determine the size of the largest ring which fits on the monitor and provide that information automatically as input to the calibration program instead of requiring the user to manually input that information as shown in accordance with the prior art at step 86, FIG. 3. Those skilled in the art will understand that even the smallest ring in FIG. 6 will occupy many pixels and thus the example of FIG. 6 is for illustration purposes only.

Figure 9:
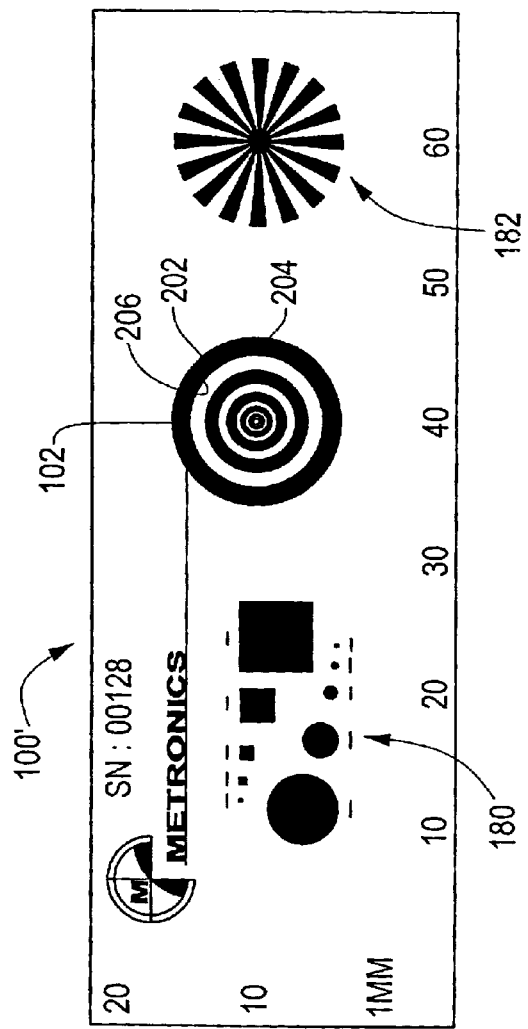
FIG. 9 is a top view of the preferred embodiment of the calibration artifact of the subject invention.

In the preferred embodiment, artifact template 100', FIG. 9 includes ring set 102 and additional artifacts as shown at 180 and 182 which are not a part of the subject invention. Ring set 102, however, could be replaced or supplemented with concentric shapes of different sizes.

As delineated in the background section above, when using video to measure objects, it is very important that the lighting be correct. It is possible to introduce distortion of the image by over saturating the image. When such over saturation occurs, the dark parts of the image appears to shrink and the light parts seem to grow. One term for this is blooming. Excess light from an edge in the image encroaches on dark pixels and they start to register as white. Extreme cases of overexposure are easily detected by an operator, but when subpixeling for accuracy, subtle effects of blooming can seriously effect measurements. It is most important to minimize these effects when calibrating a system.

On aspect of the subject invention designed to minimize this effect is the use of ring set 102, FIG. 9. The size of the outer edge 202 of ring 204 is measured and then the size of the inner edge 206 of ring 204 is measured. The average of the two measurements is then used. If blooming is affecting the measurement, the result will be to move outer edge 202 in the opposite direction of the movement of inner edge 206 of ring 204. Using the average measurement effectively cancels out the effect of the blooming. This technique works on dark rings or bright rings since the effect is the same—just in different directions.

Therefore, in another embodiment, the largest circle that fits in the field of view is measured. The second largest circle is measured. The results are averaged. Next the third largest circle is measured and averaged with the second largest. These two averaged measurements are then used for size lookup and actual calibration.

There still another advantage to this method which involves the manufacturability of artifact 100'. The ratios used for the size of the rings are not a simple progression. This is because manufacturing variability of the artifact and the accuracy of the pixel measurements play against each other as follows. As delineated in the background section above, when the smallest size circles are in use (at high magnification), the pixel resolution is small (a 10 micron spot may fill the frame). The effect of manufacturing the artifact off by a micron is much larger than measuring off by a pixel. On the other hand, if the pixels are large (low magnification) the effect of measuring off by a pixel is much more than manufacturing off by a micron. The advantage of using the average method is it also cancels out the typical problem of manufacturing this type of artifact. That problem is called "over or under etching". The pattern is laid down quite repeatability, but then the chrome is etched away. If the artifact is left in the etch too long the chrome rings will be smaller on the outer dimension, and larger on the inner dimension. This effect is very similar to blooming, and corrected by using the above measuring algorithm.

Although specific features of the invention are shown in some drawings and not in others, this is for convenience only as each feature may be combined with any or all of the other features in accordance with the invention. Also the words "including", "comprising", "having", and "with" as used herein are to be interpreted broadly and comprehensively and are not limited to any physical interconnection.

Moreover, any embodiments disclosed in the subject application are not to be taken as the only possible embodiments. Thus, other embodiments will occur to those skilled in the art and are within the following claims.

What is claimed is:

1. A calibration artifact for calibrating a machine vision measurement system, the calibration artifact comprising:
   a rigid substrate; and
   a plurality of concentric rings on one surface of the substrate, each ring of a different pre-defined size and wherein the change between the size of any two rings is different than the change in size of any other two adjacent rings.

2. The calibration artifact of claim 1 in which each ring has an inner edge and an outer edge.

3. A calibration artifact for a machine vision measurement system, the calibration artifact comprising:
   a substrate; and
   a plurality of concentric shapes on one surface of the substrate, each shape of a different pre-defined size and wherein the change between the size of any two adjacent shapes is different than the change in size between any other two adjacent shapes.

4. A calibration system comprising:
   a calibration artifact including:
      a substrate; and
      a plurality of concentric rings on one surface of the substrate, each ring of a different pre-defined size and wherein the change between the size of any two adjacent rings is different than the change between the size of any other two adjacent rings; and
      a software algorithm including a database containing the size of each ring and data reflecting the change in size between each pair of adjacent rings.

* * * * *